United States Patent
Stobie

(10) Patent No.: US 8,816,268 B1
(45) Date of Patent: Aug. 26, 2014

(54) INPUT UNIT CELL CIRCUITRY FOR TRANSDUCER READOUT

(75) Inventor: James A. Stobie, Westford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 220 days.

(21) Appl. No.: 13/460,254

(22) Filed: Apr. 30, 2012

Related U.S. Application Data

(60) Provisional application No. 61/481,100, filed on Apr. 29, 2011, provisional application No. 61/481,101, filed on Apr. 29, 2011.

(51) Int. Cl.
*H03F 3/08* (2006.01)

(52) U.S. Cl.
USPC ............................................. 250/214 A

(58) Field of Classification Search
USPC .......................... 250/214 A, 214 R
See application file for complete search history.

(56) References Cited

U.S. PATENT DOCUMENTS

| | | | |
|---|---|---|---|
| 5,343,555 A * | 8/1994 | Yayla et al. | 706/35 |
| 5,751,189 A * | 5/1998 | Shyu et al. | 330/9 |
| 6,864,965 B2 | 3/2005 | DeFlumere | |
| 6,929,214 B2 | 8/2005 | Ackleson et al. | |
| 8,547,170 B1 * | 10/2013 | Stobie et al. | 327/554 |
| 2007/0091175 A1 * | 4/2007 | Iddan et al. | 348/135 |
| 2008/0100280 A1 * | 5/2008 | Masson et al. | 324/76.38 |

OTHER PUBLICATIONS

Directional Infrared Counter Measures, http://en.wikipedia.org/wiki/Directional Infrared Counter Measures 2 pages, printed from Internet on Apr. 4, 2012.
AN/AAQ-24 Directional Infrared Countermeasures (DIRCM) 2 pages, http://www.globalsecurity.org/military/systems/aircraft/systems/an-aaq-24.htm, printed from Internet Apr. 4, 2012.

* cited by examiner

*Primary Examiner* — Thanh Luu
(74) *Attorney, Agent, or Firm* — Finch & Maloney PLLC; Neil F. Maloney

(57) ABSTRACT

Techniques are disclosed that provide time delay integration (TDI) in detection signal processing (such as a signal generated by an IR sensor). The techniques can be implemented, for example, to provide blanking and/or TDI functionality at the readout integrated circuit (ROIC) level for active focal plane array (FPA) elements or other transducer elements. In one example embodiment, an integrator circuit is configured with one or more switches for allowing integration of multiple input signal events such that reset of the integration is controlled independently and can be reset equal to or less often than the number of single events, thereby allowing one or more detected events to be integrated together within a frame interval.

20 Claims, 7 Drawing Sheets

INPUT UNIT CELL CIRCUITRY FOR TRANSDUCER READOUT

RELATED APPLICATIONS

This application claims the benefit of U.S. Provisional Application Nos. 61/481,100 and 61/481,101, each filed on Apr. 29, 2011, and each of which is herein incorporated by reference in its entirety. In addition, this application is related to U.S. Pat. No. 8,547,170, filed Apr. 30, 2012, and titled "Multimode Integration Circuit for Sensor Readout" which is herein incorporated by reference in its entirety.

FIELD OF THE DISCLOSURE

The invention relates to integration circuitry, and more particularly, to radiation sensors having signal current that is integrated during a frame interval.

BACKGROUND

Radiation sensors such as those used to detect infrared (IR) typically include electronics including circuitry that allows for the signal current to be integrated as part of the detection signal processing.

SUMMARY

One embodiment of the present invention provides an electronic device. The device includes an amplifier having an inverting input and an output. The inverting input is for receiving input from a transducer. The device further includes an integration capacitor operatively connected between the inverting input and the output, and for integrating signal from the transducer. The device further includes a first switch operatively coupled to the inverting input and for selectively stopping integration of signal from the transducer. The device further includes a second switch operatively coupled to the first switch and for selectively applying a bias to the transducer when the first switch is open (when the transducer is connected to the device). In some cases, the device includes a reset switch operatively coupled between the output of the amplifier and the inverting input (e.g., across the integration capacitor). In one such case, a non-inverting input of the amplifier is configured to receive a bias voltage that sets a reset voltage that will be presented at the amplifier output during a reset interval. In another such case, a timing scheme of the first, second, and reset switches allows a plurality of integration intervals to occur prior to a next reset interval. In some cases, the bias maintains substantially the same voltage (e.g., within an acceptable tolerance, such as +/−5% or +/−2%, or +/−1%) across the transducer as when the transducer is connected to the amplifier by the first switch. In some embodiments, the device includes the transducer, wherein the transducer is a photo sensitive detector. In other such embodiments, the transducer is a sensor element that generates a current in response to a stimulus. In some embodiments, a timing scheme of the first and second switches defines a plurality of integration intervals of different duration. In some embodiments, a timing scheme of the first and second switches defines one or more blanking intervals where the amplifier does not integrate input signal events. Numerous variations will be apparent. For instance, another example embodiment of the present invention provides a read-out integrated circuit (ROIC) comprising the electronic device as variously defined in this paragraph. Another embodiment a sensor system comprising the ROIC, wherein the system includes a transducer array operatively coupled to the ROIC. Another embodiment provides a system-on-chip comprising the sensor system.

Another embodiment of the present invention provides an integrated circuit. The integrated circuit includes a transducer array, and an amplifier having an inverting input and an output. The inverting input is for receiving input from an element of the transducer array. The integrated circuit further includes an integration capacitor operatively connected between the inverting input and the output, and for integrating signal from the element of the transducer array. The integrated circuit further includes a reset switch operatively coupled across the integration capacitor. The integrated circuit further includes a first switch operatively coupled to the inverting input and for selectively stopping integration of signal from the element of the transducer array, and a second switch operatively coupled to the transducer array and for selectively applying a bias to the transducer array when the first switch is open. In some cases, a non-inverting input of the amplifier is configured to receive a bias voltage that sets a reset voltage that will be presented at the amplifier output during a reset interval. In some cases, a timing scheme of the first, second, and reset switches allows a plurality of integration intervals to occur prior to a next reset interval. In some cases, the transducer array comprises a plurality of photo sensitive detector elements. In some cases, the transducer array comprises a plurality of sensor elements each of which generates a current in response to a stimulus. In some cases, a timing scheme of the first and second switches defines a plurality of integration intervals of different duration.

Another embodiment of the present invention provides a sensing system. The system includes a transducer array, and an amplifier having an inverting input, a non-inverting input, and an output. The inverting input is for receiving input from an element of the transducer array, and the non-inverting input is configured to receive a bias voltage that sets a reset voltage that will be presented at the amplifier output during a reset interval. The system further includes an integration capacitor operatively connected between the inverting input and the output, and for integrating signal from the element of the transducer array. The system further includes a reset switch operatively coupled across the integration capacitor. The system further includes a first switch operatively coupled to the inverting input and for selectively stopping integration of signal from the element of the transducer array, and a second switch operatively coupled to the transducer array and for selectively applying a bias to the transducer array when the first switch is open. A timing scheme of the first, second, and reset switches allows for: a plurality of integration intervals to occur prior to a next reset interval, and a plurality of blanking intervals where the amplifier does not integrate input signal events. In some cases, the transducer array comprises a plurality of photo sensitive detector elements or piezoelectric sensor elements (or other sensing element that generates an electrical signal in response to some stimulus or event).

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

Figure 1:
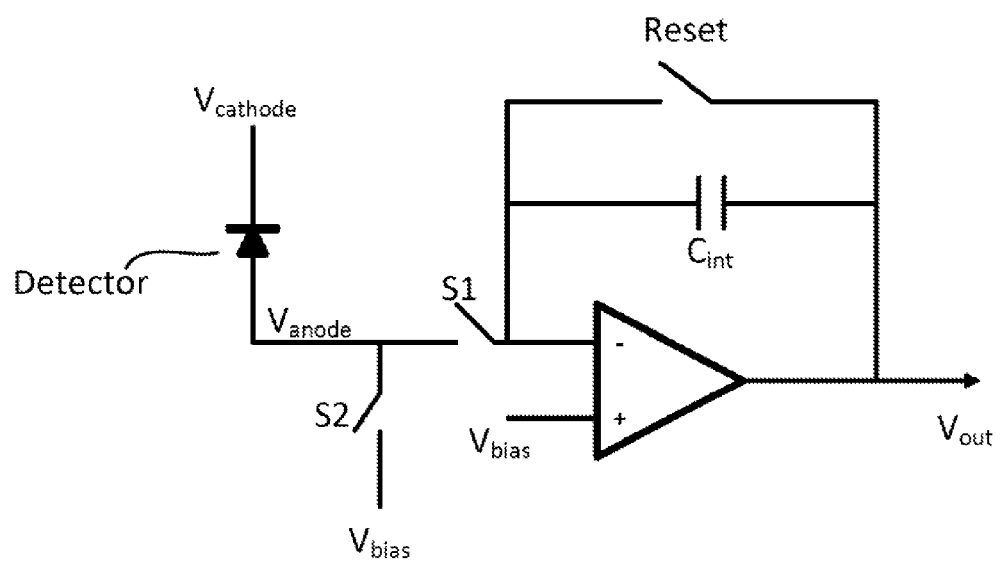
FIG. 1 illustrates a schematic of an integrator circuit configured in accordance with an embodiment of the present invention.

As will be appreciated, the figures are not necessarily drawn to scale but rather are presented to assist in understanding of the various example embodiments of the present invention. For instance, durations of time depicted in the various timing diagrams may be depicted as being longer than they actually are, so that events occurring within that duration can be depicted with better clarity.

DETAILED DESCRIPTION

Techniques are disclosed that can provide time delay integration (TDI) in detection signal processing. The techniques can be implemented, for example, to provide TDI functionality at the readout integrated circuit (ROIC) level for active focal plane array (FPA) elements, and allow more than one return to be captured and averaged to allow the desired signal level to overcome the read noise of the FPA. This added sensitivity can be used to increase range or lower the optical power of a detection system. The techniques may also be implemented to increase the sensitivity of any detector that generates a change in current as a response.

General Overview

Sensitivity of active light detection and ranging (LIDAR) systems may be limited by the optical power returned to the system. In order to increase sensitivity, a more powerful initial pulse can be used in order to possibly receive a more powerful optical reflection. Increasing the power of the active light source, however, often directly increases the size, weight and power of a system. In accordance with some embodiments of the present invention, another means to increase the sensitivity is to average multiple returns together within a single frame time to increase the signal to noise ratio. With systems that are usually read-noise limited at the maximum ranges, it may be preferable to perform the averaging in the input preamplifier cells ahead of the readout noise.

In accordance with an embodiment of the present invention, high-speed light detection and ranging (LIDAR) systems and dual mode active/passive systems are enabled to turn the integration time on and off rapidly during a frame time. Having a flexible input timing scheme that can be varied seamlessly from frame to frame enhances the capability of an active/passive sensor system. For example, with the programmable input clock flexibility built into the active/passive readout circuit, the integration time may be totally independent of the frame time and can allow for multiple integrations before sending the information out of the input unit cells for readout. This timing flexibility allows for multiple returns to be integrated within a frame time, increasing the signal above the level of the readout noise, for improved sensitivity and range.

Other capabilities afforded by an embodiment of the present invention will be apparent in light of this disclosure and include, for example, blanking of unwanted stray light, exclusion of stray pressure inputs for a piezoelectric sensor, range gating using a different range gate each frame, and/or active pixel TDI for increased sensitivity.

An embodiment of the present invention may utilize photodiodes or quantum photovoltaic detectors having signal current that is integrated during the integration interval. Other sensor technologies can be used that generate a change in current in response to a stimulus. For example, for biometric applications such as a fingerprint recognition system, the sensor may be a piezoelectric device that converts physical contact into an electrical signal.

ROIC Level Blanking Functionality

In accordance with one example embodiment, in the event that stray light activity is involved, such as the backscatter from a laser, or if multiple laser shots are fired during the frame time, the techniques provided herein can be used to temporarily stop (or blank) the integration during these transient stray light effects if desired.

FIG. 1 illustrates a schematic of an integrator amplifier circuit configured in accordance with an embodiment of the present invention. In this particular embodiment, two switches $S_1$ and $S_2$ may be introduced ahead of the amplifier. The amplifier may be a standard integrating amplifier with a capacitor $C_{int}$ and Reset switch, as shown in this example embodiment, but any suitable integrating amplifier configuration can be used. Switch $S_1$ may be connected between the output of a detector and the input of the amplifier. As noted above, the detector can be a photodiode, or any sensor that produces a change in current in response to a stimulus. Switch $S_2$ may be connected between the output of the detector and a fixed bias voltage, $V_{bias}$. Only one of the switches $S_1$ and $S_2$ may be closed (low impedance) at any given time. This configuration allows for integration of the detector current when $S_2$ is open and $S_1$ is closed. The detector current integration may be stopped by opening $S_1$ and closing $S_2$, wherein the voltage $V_{bias}$ is chosen to keep the same (e.g., within an acceptable tolerance) bias across the detector when it is normally connected to the amplifier. Integration of the detector current can resume again if $S_2$ is opened and $S_1$ is closed. The Reset switch may operate independently from the switches $S_1$ and $S_2$. The non-inverting input of the amplifier may be connected to $V_{bias}$, while the inverting input may be connected to the detector via switch $S_1$.

As will be appreciated, while a differential inverting amplifier configuration is shown (having extrinsic inverting and non-inverting inputs), a single-ended inverting amplifier configuration can also be configured in accordance with an embodiment of the present invention, where there is only an inverting input. In such single-ended cases, the non-inverting input can be thought of as intrinsic, and may be, for instance, an internally biased node of the circuit.

Figure 2:
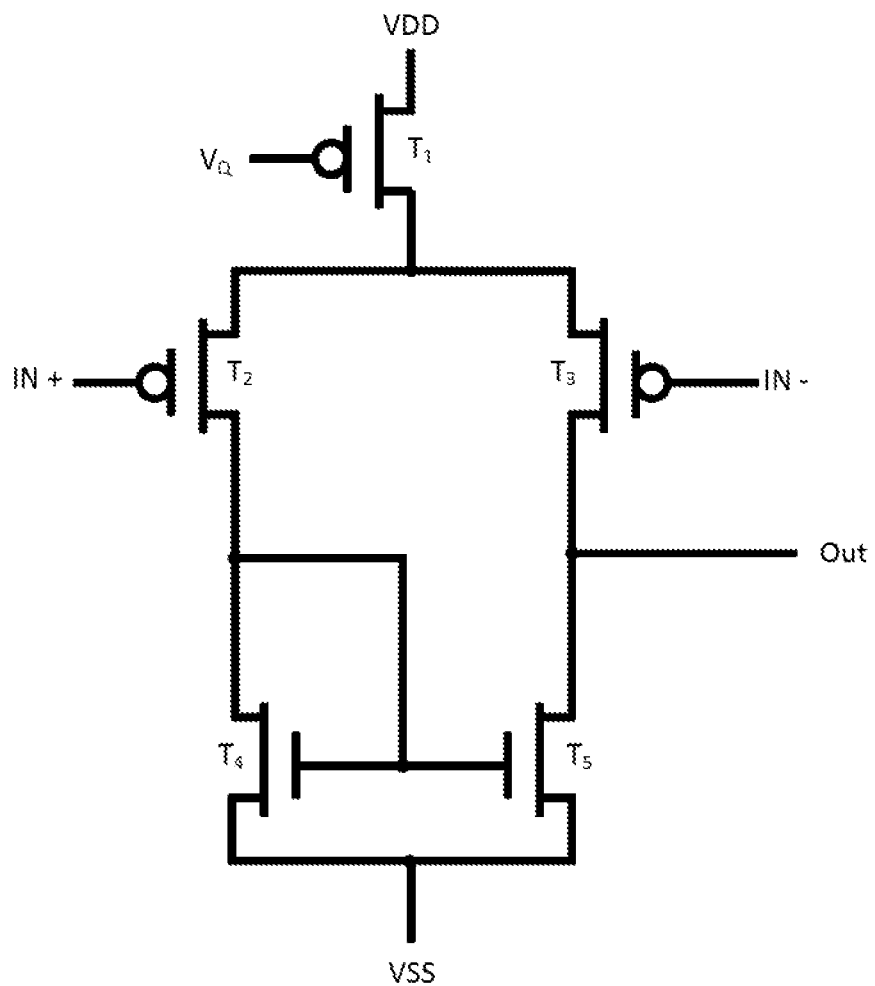
FIG. 2 is a schematic of a general differential amplifier.

FIG. 2 is a schematic of a general differential amplifier that might be suitable for use as the inverting amplifier shown in FIG. 1. As can be seen, the amplifier may include five transistors ($T_1$-$T_5$) and may be operatively coupled between power supplies VDD and VSS (not shown in FIG. 1). The differential pair of transistors $T_2$ and $T_3$ may receive the differential input signal (IN+, IN−). In addition, transistors $T_4$ and $T_5$ operate as the load devices of the amplifier and are connected as a master-slave current-source pair to ensure that both legs have the same current (within an acceptable tolerance, such as +/−2%). The non-inverting leg of the differential amplifier includes $T_2$ and $T_4$, and the inverting leg includes $T_3$ and $T_5$. As will be appreciated, note that the situation where the current-source pair ensures that both legs have the same current only applies when no external current is drawn from the amplifier output, such as under quiescent conditions with no DC load externally connected to the amplifier output. On the other hand, when output current is drawn, the current source pair maintains equal currents in transistors $T_4$ and $T_5$, but the current in transistor $T_3$ will be different. Transistor $T_1$ operates as a current source during normal operation, and sets the amplifier operating current or quiescent point based on the value of $V_Q$ (not shown in FIG. 1), which can be set as desired for a given application, as can the value of the power supplies VDD and VSS. Although the amplifier is described in reference to the configuration of FIG. 2, this is for illustrative purpose only, and additional amplifier configurations may be used in the amplifier circuit disclosed in FIG. 1.

Figure 3:
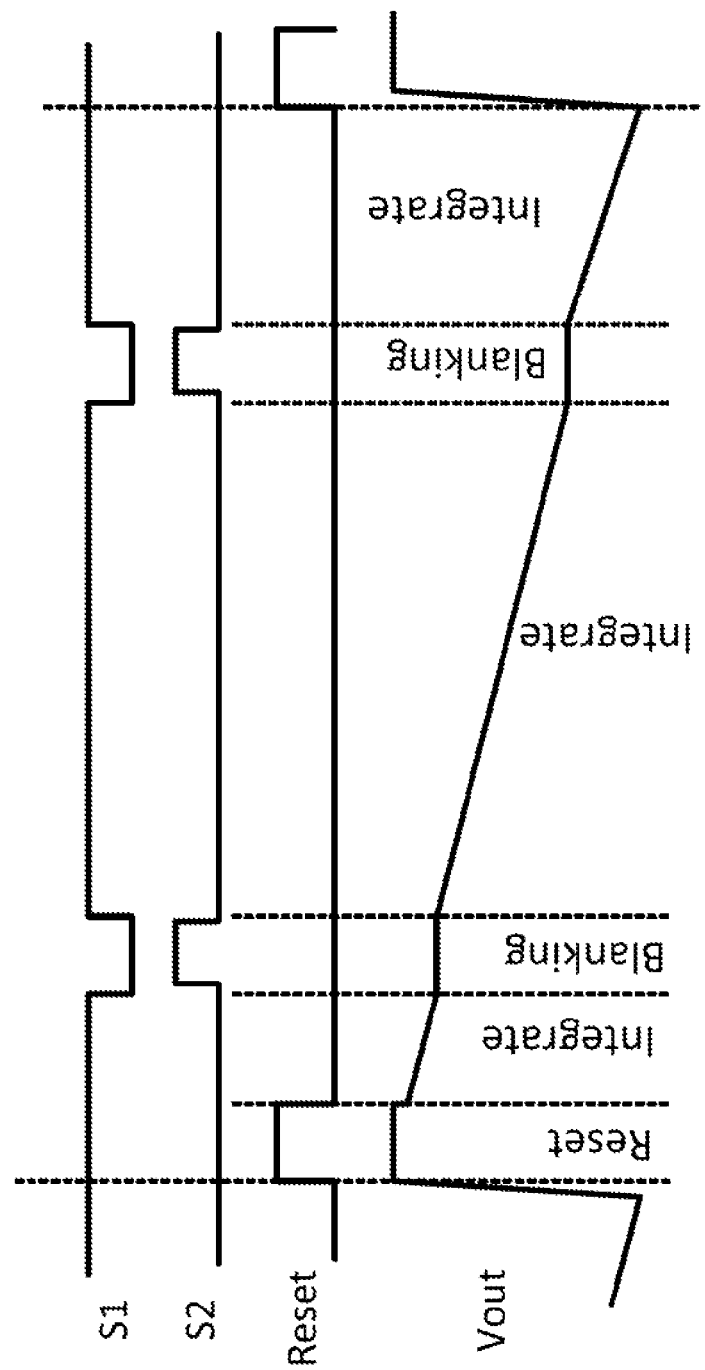
FIG. 3 illustrates a blanking interval timing diagram with integration intervals, in accordance with one embodiment of the present invention.

FIG. 3 illustrates a blanking interval timing diagram with integration intervals, in accordance with one embodiment of the present invention. As shown, multiple integration intervals may be defined during a given frame time. The integration interval may occur when switch $S_1$ is closed, switch $S_2$ is opened, and Reset is opened. As can be seen, during the blanking intervals, the magnitude of $V_{out}$ may remain constant because switch $S_1$ is opened and $S_2$ connects the detector to $V_{bias}$. When integration resumes, the magnitude of $V_{out}$ may be substantially equal to its magnitude prior to the blanking interval. Blanking time can be determined, for example, from an external signal or other command signal indicating the need to interrupt the integration cycle. The blanking intervals and integration intervals can have different durations and positions within a given frame time.

According to one embodiment of the present invention, the two switches $S_1$ and $S_2$ may be implemented to divert an unwanted detector current. This detector current may be the result of backscattering of an initial pulse, other unwanted stray light, or any unwanted detector stimulus. In one such embodiment, the connecting the detector to $V_{bias}$ with switch $S_2$, while opening switch $S_1$, allows the voltage on the detector to be maintained while also shunting the charge created on the detector by excess stray light. Once the stray light event has passed, $S_2$ may be opened and $S_1$ may be closed again to resume the integration of the detector signal current. In one example embodiment, prior knowledge of stray light events can be communicated to the control electronics for these switches.

Figure 4:
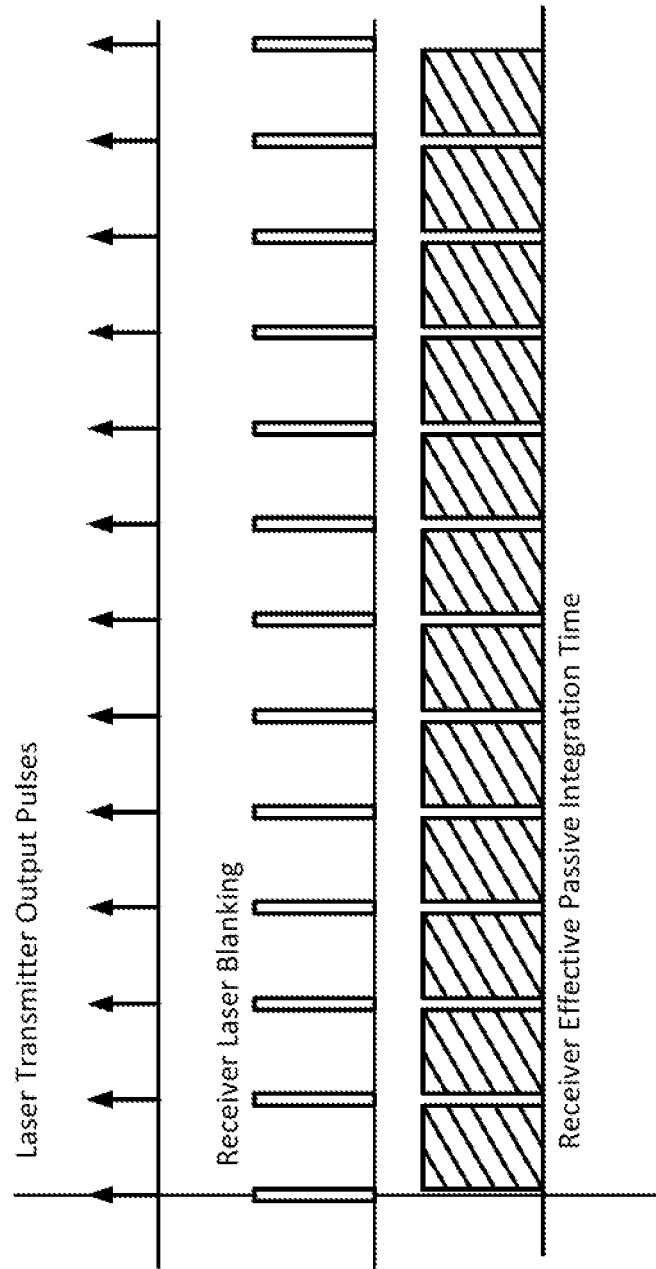
FIG. 4 illustrates a laser blanking and integration timing diagram in accordance with one embodiment of the present invention.

FIG. 4 illustrates a laser blanking timing diagram in accordance with one embodiment of the present invention. In this particular embodiment, a transmitter emits output pulses, as shown on the top timing diagram. The transmitter can generate a laser, an IR laser pulse, or other suitable output pulse. In order to prevent any backscatter from the output pulse from being detected by the receiver or detector, a blanking interval may accompany the output pulse. The blanking interval is shown in the middle timing diagram, accompanying the output pulses. This laser blanking technique can eliminate self-blinding by the output laser pulse. The bottom timing diagram shows the effective passive integration time of the receiver. In this embodiment, no integration occurs during the blanking interval to prevent backscatter detection. The effective passive integration time may also account for the blanking time required for each pulse.

ROIC Level TDI Functionality

In one example embodiment, the integrator circuit can be configured as a Charge Transimpedance Integration Amplifier (CTIA) detector input amplifier circuit that is capable of performing the active TDI function. The three switches labeled Reset, $S_1$ and $S_2$ can make this possible. The integration function may be stopped based on the switch control described above, and the amplifier can resume integration of the detector signal current after a blanking interval.

Figure 5:
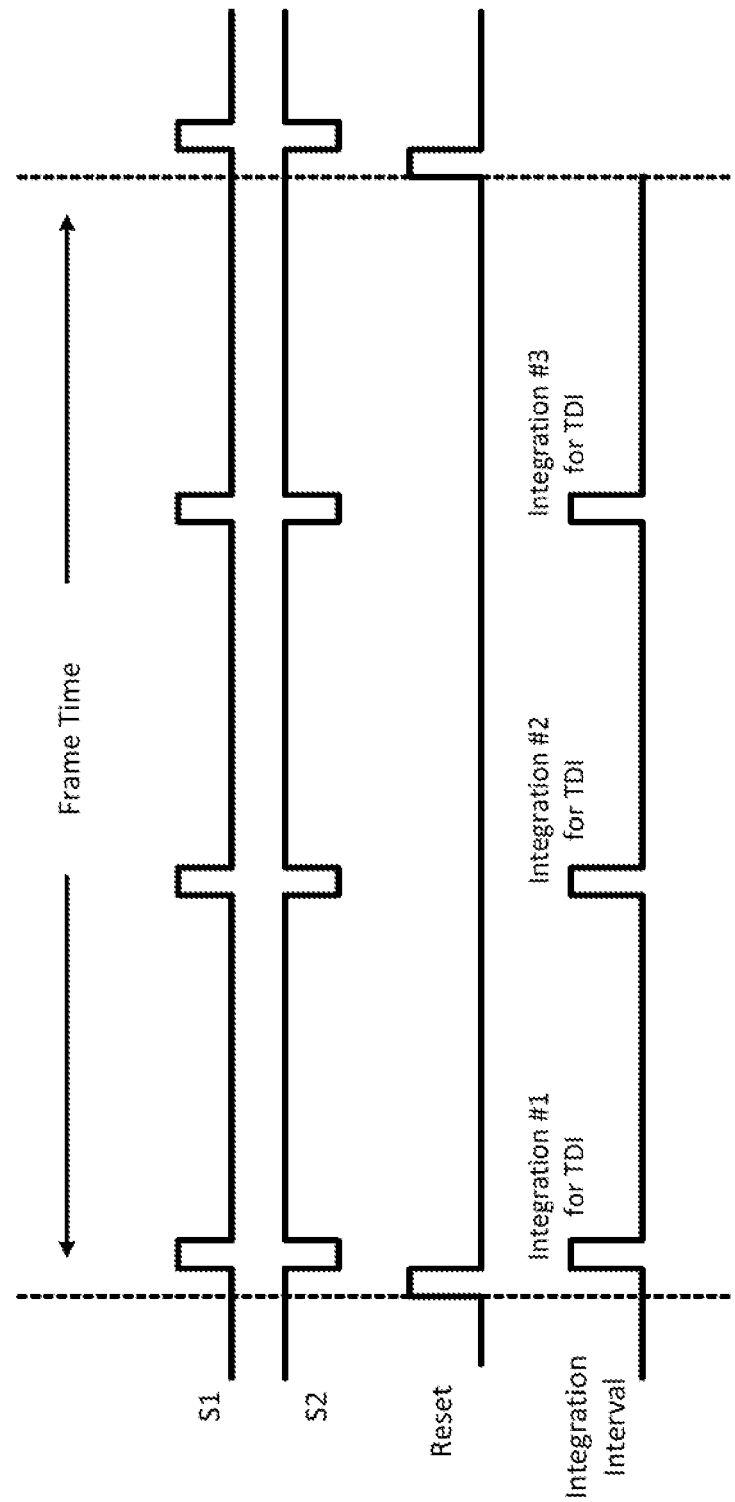
FIG. 5 illustrates the active time delay integration (TDI) function, in accordance with an embodiment of the present invention.

FIG. 5 illustrates a TDI timing diagram in accordance with one embodiment of the present invention. As shown in this example, the frame time can be determined by the time between Reset intervals. The timing of the switches $S_1$, $S_2$, and Reset can be controlled to achieve the integration of multiple returns onto a CTIA integration capacitor within a single frame time. In one example embodiment, three integration intervals may be achieved within a frame time, although more or less integration intervals are possible within a frame time in different embodiments. The integration intervals may be identically spaced within the frame time, or may be positioned in any other desired configuration. In this particular embodiment, the reset occurs at the beginning of each frame time. The ability to perform multiple integration intervals within a given frame time can increase the sensitivity of an sensor element without altering the frame time.

Figure 6:
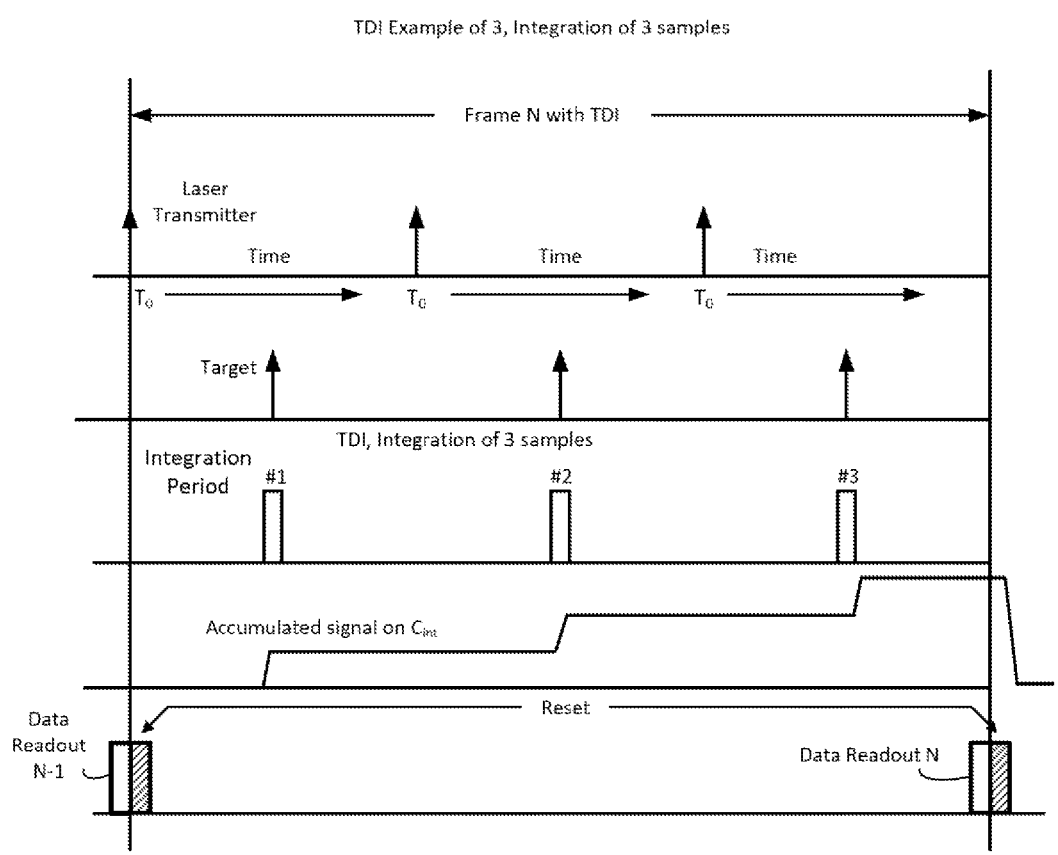
FIG. 6 illustrates a TDI timing diagram with multiple output pulses and multiple integration intervals, in accordance with one embodiment of the present invention.

FIG. 6 illustrates a TDI timing diagram with multiple output pulses and multiple integration intervals, in accordance with one embodiment of the present invention. According to one embodiment, TDI techniques may be implemented with a laser pulse transmitter that searches for a target location by receiving reflections of the laser output pulses from the target. Multiple output pulses may be transmitted within a frame, with each pulse sent out at time $T_0$ with respect to that particular pulse. Other implementations with more or fewer output pulses will be apparent in light of this disclosure. The frame time, and therefore the time between resets, may be determined by the output pulse repetition rate. The number of integration intervals may be determined by the number of output pulses, the amount of sensitivity desired, and/or by other factors. As the system searches to locate a target in range, more sensitivity may be required as a search in range is increased. The TDI mode may be invoked and the number of TDI samples may be increased accordingly. In the search of an optical return, for instance, the receiver integration period (or gate time) may be incrementally placed later in time until the desired range is covered. As shown in the example of FIG. 6, three output pulses are transmitted and the optical return from the target is received for each corresponding pulse. The three optical returns may be received (#1, #2, and #3) and integrated using the TDI techniques described above. The sum of the integrated samples at the end of the frame time may be sampled and available to be read out. The readout may take place simultaneously with the integration of the subsequent frame time.

According to one embodiment of the present invention, the data from the integration intervals is read out at the end of each frame time. Just before the reset, the information captured on the integration capacitor $C_{int}$ may be read out, and this may introduce readout noise. In one embodiment, particularly when the return signal to read noise ratio is low, integrating multiple returns in the TDI mode can improve this signal to noise ratio. Integrating three returns within one frame, for example, may result in three times the signal to noise ratio compared to integrating only a single return. In one example embodiment, TDI techniques can allow more than one return to be captured and integrated within a frame time, allowing the desired signal level to overcome readout noise of the sensor array. In one such embodiment, this added sensitivity can be used to increase range or lower the optical power of the active system.

Sensing System

Figure 7:
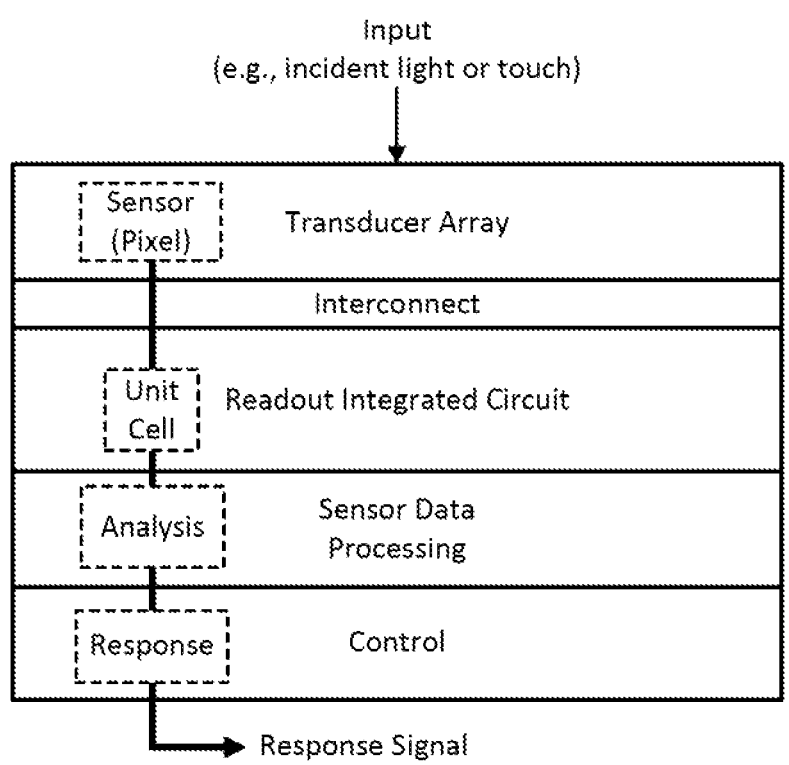
FIG. 7 illustrates a sensing system configured in accordance with an embodiment of the present invention.

FIG. 7 illustrates one implementation of an ROIC, in accordance with an embodiment of the present invention. In this example implementation, the ROIC is used in the sensing system. As can be seen, the system generally includes a transducer array operatively coupled to the ROIC via an interconnect. The ROIC may in turn be operatively coupled to a sensor data processing block, which may be connected to a control circuit. In addition, the ROIC can further be configured to include, for example, input unit cell preamplifier circuits each configured with an amplifier as described herein, such as shown in FIG. 2.

In some embodiments where the transducer array is, for example, a CMOS FPA suitable for imaging applications, the array can share the same substrate with the ROIC, or can be integrated with the ROIC via flip-chip hybridization using, for instance, indium bump bonding or other suitable interconnect process. In another embodiment, the transducer array can be implemented as a CMOS piezoelectric (for cell force sensing) or capacitive (cell touch sensing) sensor array suitable for biometric or security applications, such as fingerprint detection. Just as with imaging applications, each pixel sensor element can be electrically connected to its own integration unit cell circuitry in the ROIC. As will be appreciated, the pixel resolution of imaging applications may be much higher than the pixel resolution of biometric applications, but the principles provided herein equally apply to any such applications, as will be appreciated in light of this disclosure.

Each input unit cell of the ROIC can include an amplifier circuit configured as shown, for instance, in FIG. 1. The unit cell may include other circuitry as well, such as filtering if so desired. The ROIC may further include row and column select circuitry, column sense amplifiers, multiplexor circuitry, and other typical ROIC circuitry. In one specific such embodiment, the transducer array is bump-bonded or otherwise integrally coupled with the ROIC so as to provide a system-on-chip which can be operatively coupled to the sensor data processing block. In still other embodiments, the sensor data processing block and control blocks can be integrated with the ROIC circuitry, in another system-on-chip configuration.

As will be appreciated, the analysis carried out by the sensor data processing block will depend on the given application and type of sensor technology employed in the transducer array. For instance, in imaging applications, the sensor data processing block may be configured to identify certain features or events reflected in the imaging data and/or otherwise interpret the image data so that the control block can be directed accordingly. For biometric applications, the sensor data processing block may be configured to identify certain biometric features or events (e.g., fingerprint, eye-scan, touch, etc.) reflected in the biometric data. In a more general sense, regardless of the given application, the sensor data processing block can be configured to carryout feature/event identification using the data received from the transducer array. Once features/events have been extracted from that sensor data, they can be, for instance, compared to one or more templates stored in the database and assigned a matching score. The sensor data processing block may further be configured, for example, to execute a determination as to a response strategy, based on a given matching score. For instance, in an imaging application involving electronic countermeasures, the image data may reflect the type of incoming threat (e.g., missile), and the response strategy may include a particular evasive maneuver and/or electronic counter-measure to which that incoming threat is known to be susceptible (e.g., chaff deployment and/or jamming). In biometric applications such as fingerprint verification, the biometric data may reflect the various fingerprint details reflected in the tactile pressure applied at the sensor face, and the response strategy may include providing (or denying) access to a given secured area. As will be appreciated, the analysis carried out by the sensor data processing block can include any number of determinations necessary to effectively direct the control block accordingly.

Based on the assessment of the sensor data processing block, a response can then be provided by the control block, which will also depend on the given application. For instance, in an imaging application involving electronic countermeasures, the control block may electronically command the particular evasive maneuver and/or electronic counter-measure to which that incoming threat is known to be susceptible (e.g., chaff deployment and/or jamming). In biometric applications such as fingerprint verification, the control block may issue the control signal needed to open a door that provides access to the secured area. Numerous sensor data processing/analysis and control/response schemes can be used here as will be appreciated in light of this disclosure and the claimed invention is not intended to be limited to any particular ones.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An electronic device comprising:
an amplifier having an inverting input and an output, the inverting input for receiving input from a transducer;
an integration capacitor operatively connected between the inverting input and the output, and for integrating signal from the transducer during an integration cycle;
a first switch operatively coupled to the inverting input and for selectively opening to interrupt integration of signal from the transducer, so as to provide an interrupt point in the integration cycle; and
a second switch operatively coupled to the first switch and for selectively applying a bias voltage to the transducer when the first switch is open and for selectively opening upon subsequent closure of the first switch to resume the previously interrupted integration cycle from the interrupt point.

2. The device of claim 1 further comprising a reset switch operatively coupled between the output of the amplifier and the inverting input.

3. The device of claim 2 wherein a non-inverting input of the amplifier is configured to receive a bias voltage that sets a reset voltage that will be presented at the amplifier output during a reset interval.

4. The device of claim 2 wherein a timing scheme of the first, second, and reset switches allows a plurality of integration intervals to occur prior to a next reset interval.

5. The device of claim 1 wherein the bias voltage maintains the voltage across the transducer to be within 5% of the first voltage.

6. The device of claim 1 further comprising the transducer, wherein the transducer is a photo sensitive detector.

7. The device of claim 1 further comprising the transducer, wherein the first switch and the second switch do not close in an overlapping fashion.

8. The device of claim 1 wherein a timing scheme of the first and second switches defines a plurality of integration intervals of different duration.

9. The device of claim 1 wherein a timing scheme of the first and second switches defines one or more blanking intervals where the amplifier does not integrate input signal events.

10. A read-out integrated circuit (ROIC) comprising the electronic device of claim 1.

11. A sensor system comprising the ROIC of claim 10 wherein the system includes a transducer array operatively coupled to the ROIC.

12. A system-on-chip comprising the sensor system of claim 11.

13. An integrated circuit, comprising:
a transducer array;
an amplifier having an inverting input and an output, the inverting input for receiving input from an element of the transducer array;
an integration capacitor operatively connected between the inverting input and the output, and for integrating signal from the element of the transducer array during an integration cycle;
a reset switch operatively coupled across the integration capacitor;
a first switch operatively coupled to the inverting input and for selectively opening to interrupt integration of signal from the element of the transducer array, so as to provide an interrupt point in the integration cycle; and
a second switch operatively coupled to the transducer array and for selectively applying a bias voltage to the transducer array when the first switch is open and for selectively opening upon subsequent closure of the first switch to resume the previously interrupted integration cycle from the interrupt point;
wherein the first and second switches do not close in an overlapping fashion.

14. The integrated circuit of claim 13 wherein a non-inverting input of the amplifier is configured to receive a bias voltage that sets a reset voltage that will be presented at the amplifier output during a reset interval.

15. The integrated circuit of claim 13 wherein a timing scheme of the first, second, and reset switches allows a plurality of integration intervals to occur prior to a next reset interval.

16. The integrated circuit of claim 13 wherein the transducer array comprises a plurality of photo sensitive detector elements.

17. The integrated circuit of claim 13 wherein the transducer array comprises a plurality of sensor elements each of which generates a current in response to a stimulus.

18. The integrated circuit of claim 13 wherein a timing scheme of the first and second switches defines a plurality of integration intervals of different duration.

19. A sensing system, comprising:
a transducer array;
an amplifier having an inverting input, a non-inverting input, and an output, the inverting input for receiving input from an element of the transducer array, wherein the non-inverting input is configured to receive a bias voltage that sets a reset voltage that will be presented at the amplifier output during a reset interval;
an integration capacitor operatively connected between the inverting input and the output, and for integrating signal from the element of the transducer array during an integration cycle;
a reset switch operatively coupled across the integration capacitor;
a first switch operatively coupled to the inverting input and for selectively opening to interrupt integration of signal from the element of the transducer array, so as to provide an interrupt point in the integration cycle; and
a second switch operatively coupled to the transducer array and for selectively applying a bias voltage to the transducer array when the first switch is open and for selectively opening upon subsequent closure of the first switch to resume the previously interrupted integration cycle from the interrupt point;
wherein a timing scheme of the first, second, and reset switches allows for:
a plurality of integration intervals to occur prior to a next reset interval; and
a plurality of blanking intervals where the amplifier does not integrate input signal events.

20. The system of claim 19 wherein the transducer array comprises a plurality of photo sensitive detector elements or piezoelectric sensor elements.

* * * * *